United States Patent [19]

Witt, Jr.

[11] 4,073,947

[45] Feb. 14, 1978

[54] PREPARATION OF A BEER-TYPE BEVERAGE

[75] Inventor: Paul R. Witt, Jr., Muscatine, Iowa

[73] Assignee: Grain Processing Corporation, Muscatine, Iowa

[21] Appl. No.: 764,567

[22] Filed: Feb. 1, 1977

Related U.S. Application Data

[63] Continuation-in-part of Ser. No. 584,659, June 6, 1975, abandoned.

[51] Int. Cl.$^2$ ............... C12C 9/00; C12C 11/04; C12G 3/00
[52] U.S. Cl. ............................ 426/13; 426/16; 426/29
[58] Field of Search ............... 426/11, 13, 14, 16, 426/29

[56] References Cited

U.S. PATENT DOCUMENTS

| | | | |
|---|---|---|---|
| 3,295,987 | 1/1967 | Hoshino et al. | 426/29 X |
| 3,332,779 | 7/1967 | Krabbe et al. | 426/16 |
| 3,719,500 | 3/1973 | Walmsley et al. | 426/16 |
| 3,908,021 | 9/1975 | Rehberger et al. | 426/16 |

*Primary Examiner*—David M. Naff
*Attorney, Agent, or Firm*—Neuman, Williams, Anderson & Olson

[57] ABSTRACT

A non-distilled beer-type beverage is produced from a wort prepared from hydrolyzed starch that is fortified with a protein hydrolyzate, a source of ammonium ions and potassium phosphate.

6 Claims, 4 Drawing Figures

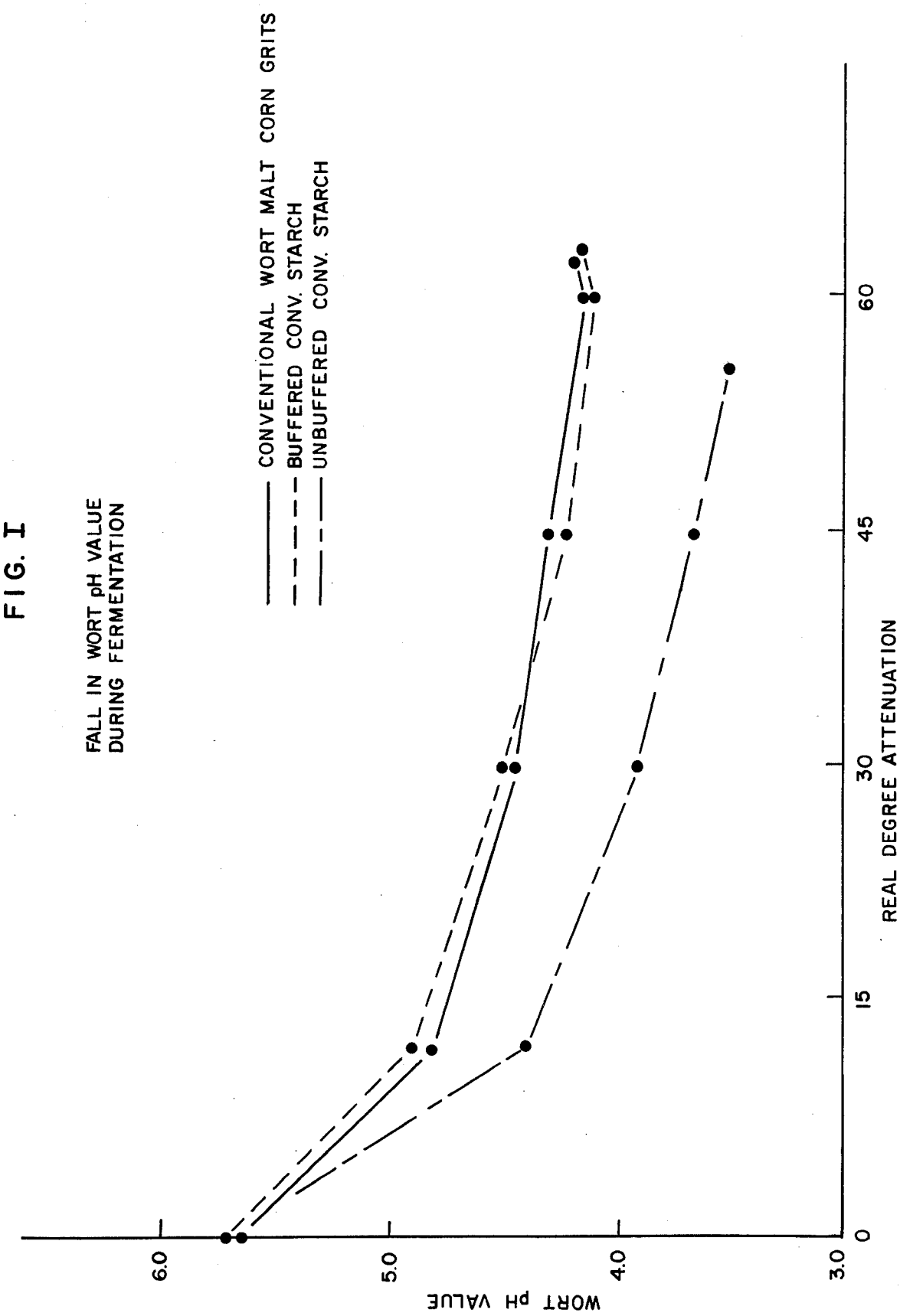

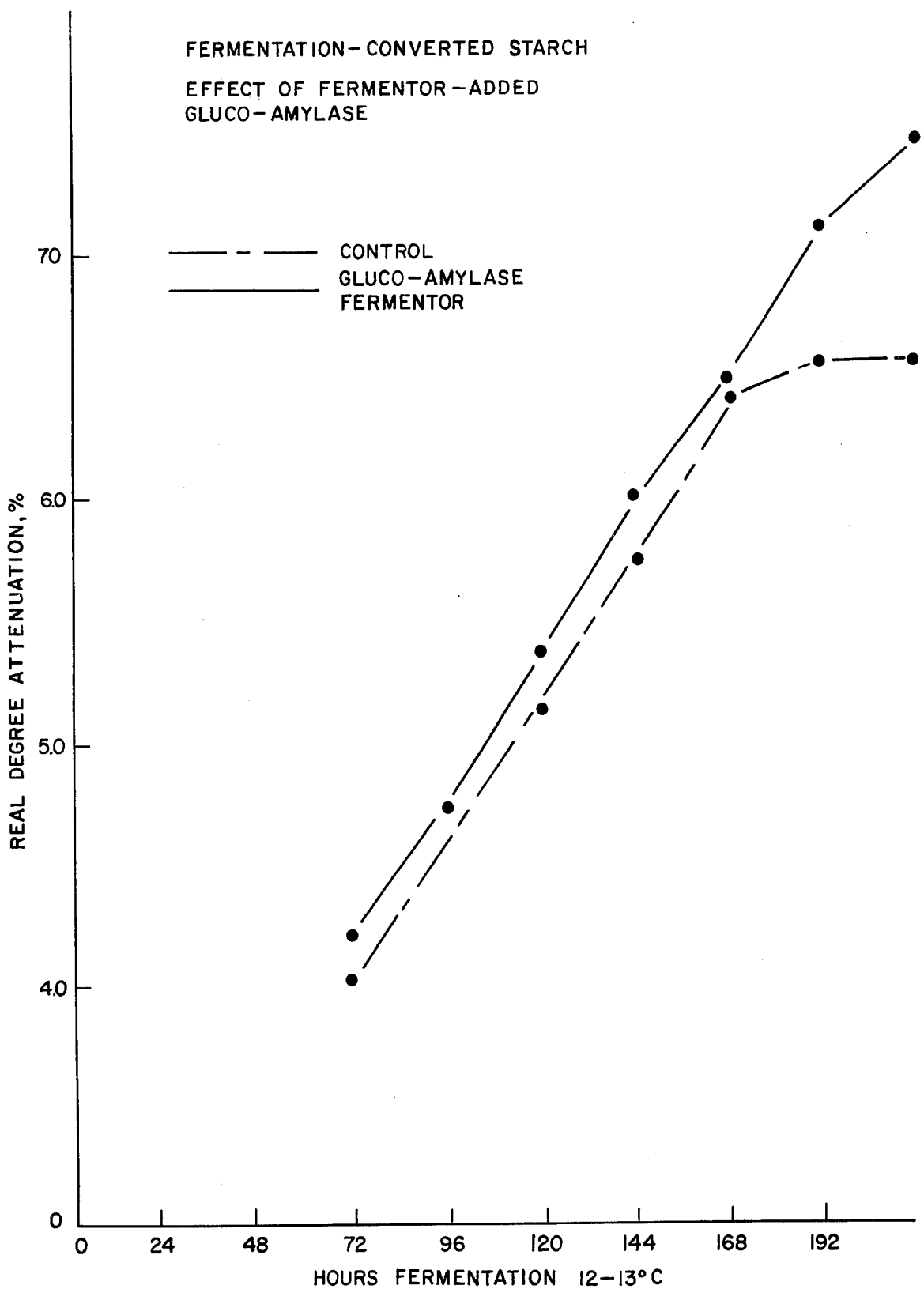

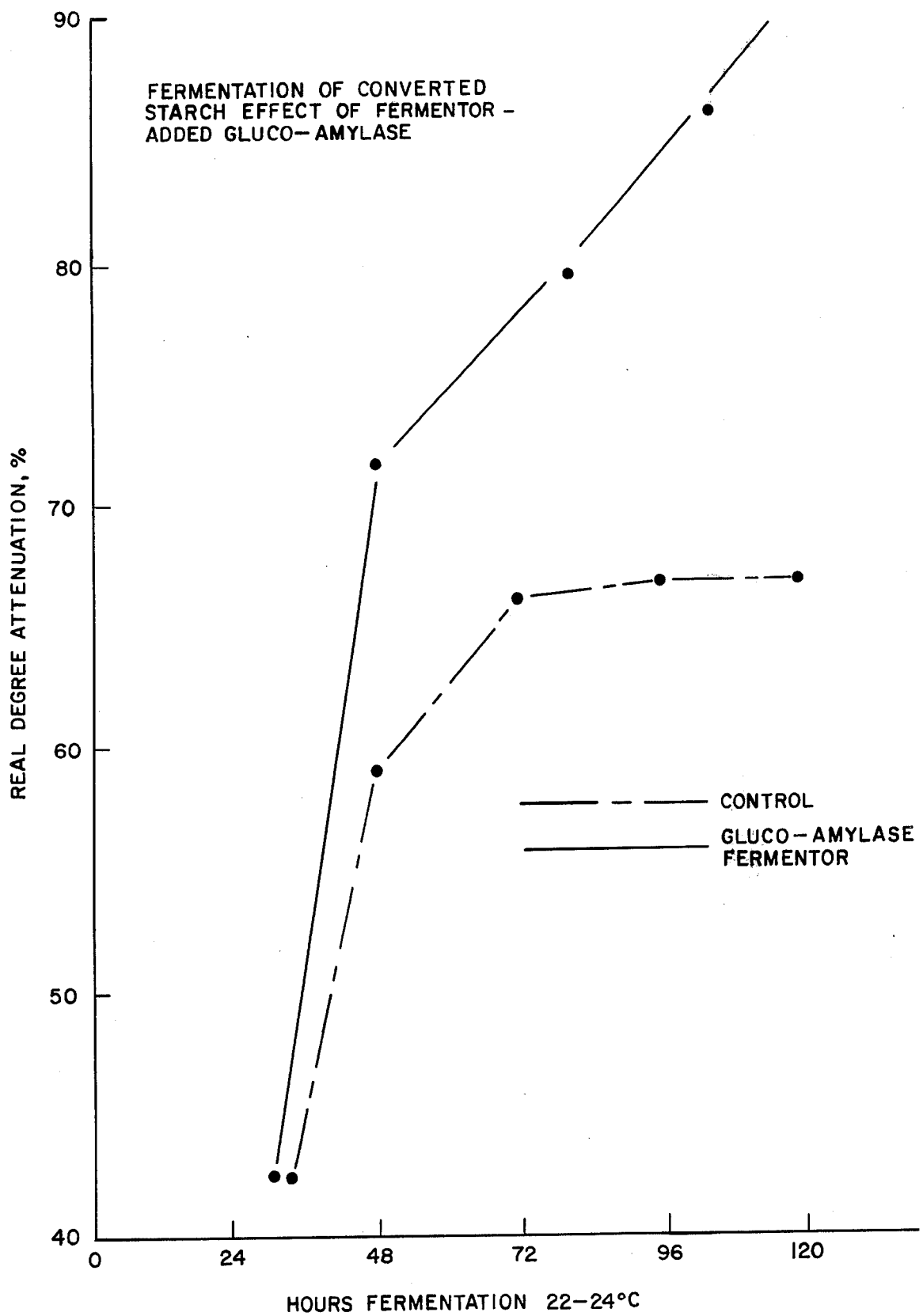

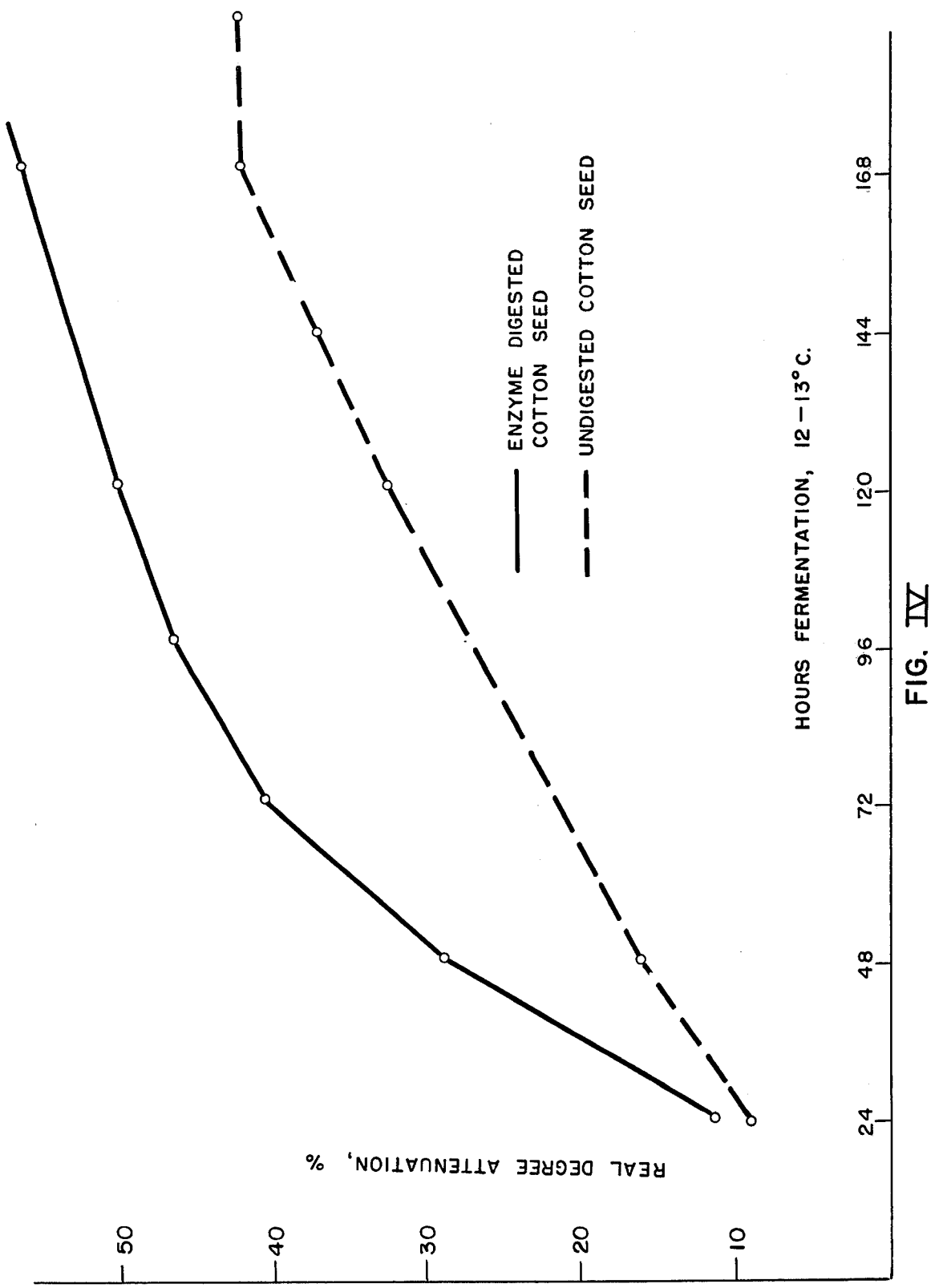
FIG. IV

PREPARATION OF A BEER-TYPE BEVERAGE

This application is a continuation-in-part of my co-pending application Ser. No. 584,659 filed June 6, 1975, now abandoned.

This invention relates to production of a non-distilled beer-type beverage. More particularly, the invention relates to a novel process for producing a beer-type alcoholic beverage with reduction in or elimination of heretofore conventional wort constituents.

Beer conventionally is made from malted barley with additions (adjuncts) of rice, corn grits, etc. to increase fermentable carbohydrate content. In the production of wort the ground malt and adjunct are mixed with water and heated to elevated temperatures to gelatinize the starch and accelerate enzymatic activity (mashing). The mash then must be filtered or lautered to remove the insoluble, mainly fiberous solids. The equipment for mashing and lautering is expensive and adds considerably to brewery construction costs. The operations themselves are time consuming, thus adding to operation costs. In addition, after the mash is lautered the spent grains must be removed from the lauter tun and recovered by drying. This again requires capital equipment and adds to operating costs. During the mashing process, protein is converted to amino acids and other lower molecular weight compounds that can be assimilated by the yeast, and starch is converted to maltose which is fermented to alcohol, and to higher polysaccharides that contribute to flavor and viscosity (mouth feel) of the finished product. Due to the high concentration present, not all of the amino acids are assimilated but some are deaminated and decarboxylated to produce higher molecular weight alcohols. Furthermore, some of the proteins, proteases and peptones that remain and may be formed on storage are insoluble at low storage temperatures and contribute to haze. This requires treatment with chillproofing proteolytic enzymes such as papain or other treatments such as with silicic acid to prevent haze formation in the final product. In addition, if the fermentation is conducted at or near optimum fermentation temperatures, other unknown factors contribute to the formation of undesirable levels of esters and the above-mentioned higher molecular weight alcohols. To overcome this, the fermentation is normally conducted at about 13° C. which results in a reduced fermentation rate and the resulting extended incubation time requires production and storage capacities that would not be needed if a higher temperature could be used. Furthermore, cooling is required to maintain this low temperature. In addition, it is accepted in the brewing industry that the use of 50 percent or more adjunct extract in the mash causes problems: (1) Detriment to fermentation because of deficiency of malt-contributed nutrients; and (2) brewhouse efficiency or extract yield recovery is reduced. Furthermore, it is normal practice to ferment at only about 11.5 percent dissolved solids. Thus, to overcome these problems, it is normal practice to prepare a mash with somewhat less than 50 percent adjunct and ferment under normal conditions of about 13° C. temperature with about $1.0 \times 10^7$ yeast cells/milliliter as inoculum and a fermentation time of about 6 to 9 days to attain a real degree of attenuation (RDA) of 62-65 percent. In conventional brewing practice a minimum of 50% malt is usually required to separate the wort from the insoluble fractions of the mash in the lauter tun. Lesser amounts of malt result in inefficiency both in filtration and in subsequent sparging operations conducted to wash out the residual solubles. The malt also serves as a source of flavoring agents, enzymes and yeast nutrients in addition to the nitrogen and carbohydrates.

I have now discovered that when a wort is prepared with hydrolyzed starch that is fortified with a protein hydrolyzate, a source of ammonium ions and phosphate, dissolved carbohydrate solids in levels as high as 23-25 percent can be fermented to attain up to a 68 percent RDA in 48 hours or less. To accomplish this, a standard level of yeast inoculum can be used with an incubation temperature in the range of about 22°-28° C. The product requires no "chillproofing" treatment and contains a low level of esters and higher alcohols.

One object of this invention is the production of beer from starch using high solids levels.

Another object of the invention is to produce a light beer with low levels of volatiles (esters and high molecular weight alcohols).

Another object of the invention is the elimination of the mashing and lautering steps in wort preparation.

Another object of the invention is to produce a light beer that does not require chillproofing.

Still another object of the invention is to conduct the beer fermentation at higher temperature and shorter times than is needed for conventional malt beers without the production of undesirable products such as esters, higher molecular weight alcohols or diacetyl.

Another object of the invention is to produce a high quality beer that can be used to blend with regular malt beers to produce a beverage of normal lager beer characteristics but with a reduction of initial malt solids to as low as 10-15 percent.

The new process of the invention involves essentially hydrolysis of starch involving liquefaction with acid or enzyme and enzymatic conversion or saccharification to give a hydrolyzate having a dextrose equivalent value (D.E.) which can vary in accordance with the desires of one practicing the process but which is typically in the range of about 40 to 50 D.E. and a carbohydrate profile comparable to that in a conventional brewer's wort, addition of a protein hydrolyzate and a source of ammonium ion as a nitrogen source and a potassium phosphate buffer to control pH and also to provide nutrient potassium and phosphate. A starch hydrolyzate having a dextrose equivalent (D.E.) value of less than 40 can be used if a beverage with more body is desired. Likewise, the starch hydrolyzate can have a dextrose equivalent value greater than 50, such higher values being attainable by the use of alpha-1,6-glucosidase such as pullulanase and/or isoamylase in combination with beta-amylase if it is desired to increase maltose production. The starch hydrolyzate useful in this invention generally has a dextrose equivalent value in the range of about 35 to 65 with a dextrose equivalent value of 40 to 55 being generally preferred.

One embodiment of the process to produce a light type beverage involves the addition of the enzyme, glucoamylase, to the wort at the time of yeast inoculation to permit nearly complete fermentation or the attainment of a higher real degree of attenuation (RDA) than normally occurs in beer.

The present invention will now be described in further detail in accordance with a presently preferred embodiment thereof. If more body is desired, however, one may stop the conversion of carbohydrate to fermentable sugars at any desired point to give more dextrins and less fermentable sugar than indicated in the specific process now to be described. Thus, the process is not restricted to attainment of any specific RDA.

Water of suitable pH, e.g. 5.5 to 7.0, and containing calcium and magnesium salts is employed. The pH of the water is adjusted to about pH 6.2–6.5 if necessary. Thus, if necessary, sufficient calcium, e.g. as calcium sulfate, is added to raise the concentration of calcium to 70 to 80 parts per million, and a source of magnesium, such as magnesium chloride, is then added to raise the magnesium concentration of the water to 25 to 30 parts per million. About 125 parts per million potassium chloride is added so that the total chloride concentration of water is about 150 to 160 parts per million. Starch and about 500 SKB units of an amylase enzyme per kilogram of starch or clear malt infusion, 0.025 to 0.10 percent of the weight of starch, are added with stirring. Heating is conducted as follows:

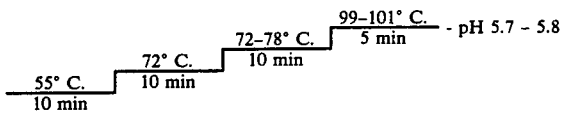

After about 5 minutes at 99°–101° C., the temperature is reduced to 62°–64° C. and a mixture of potassium hydrophosphate and potassium phosphate is added to adjust the pH to 4.8 to 6.5, preferably 5.4 to 5.6. The potassium phosphate salts are added such that the amounts of potassium and of phosphorus approximate the level of commercial beer wort, which is about 400 parts per million potassium and 290 parts per million phosphorus, but these levels could range from 200 to 600 parts per million and 100 to 400 parts per million, respectively.

Any source of the enzyme beta-amylase can be used to convert the liquefied starch to the fermentable carbohydrate profile found in conventional wort. These include bacterial, fungal and vegetable sources such as malted or unmalted barley, unheated soy flakes, wheat and so forth. Malt infusion which can be prepared by digesting 4900 grams barley malt in 10 liters water at 50°–52° C. for 15 to 45 minutes is added at a level of 0.5 to 2.5 percent of the weight of the starch, based on the whole or unextracted malt. Starch conversion consists of holding a starch suspension, e.g., 33 percent in water, with the malt infusion at 60°–61° C. for 50 minutes then at 75°–78° C. for 10 minutes. Modification of the procedure such as jet cooking the starch slurry at 90° to 121° C. followed by liquefaction with a source of alpha-amylase at a temperature up to the maximum for the particular type of alpha-amylase being used, cooling to the proper temperature, e.g., 55° to 60° C., and converting with a source of beta-amylase may also be used.

A typical carbohydrate profile of a conventional wort and a converted starch used in accordance with this invention is as follows:

|  | Carbohydrate Profile | | |
| --- | --- | --- | --- |
|  | Glucose % | Maltose % | Triose % |
| Converted Starch | 4.7 | 57.5 | 12.6 |
| Conventional Wort | 5.6 | 47.1 | 12.4 |

For use in this invention, the starch is hydrolyzed to achieve a typical dextrose equivalent value (D.E.) of from about 35 to 65 with the monosaccharide content of the hydrolyzate not exceeding about 10% of the total carbohydrates. Hydrolysis of the starch to convert it essentially to dextrose is deleterious in acceptable brewery operations. High dextrose contents in conventional worts reportedly necessitates extended periods for fermentation.

The converted and buffered starch is transferred to a brew kettle and a protein hydrolyzate added to a level of 0.125 to 0.25 gram soluble protein (N × 6.25) per 100 milliliter wort together with 0.2 to 0.4 milligram ammonium nitrogen per milliliter and incremental hopping added to produce a final beer level of 10–12 IBU units. (International Bittering Units — standard measurement for hop bitterness.) Total kettle boiling time is from about 20 to 40 minutes.

Depending on the selected fermentation temperature, the wort is cooled to about 13°–28° C. while being saturated with sterile air. Higher temperatures, for example 35° to 40° C., can be used, although 28° to 30° C. is generally considered to be optimum for yeast growth and fermentation.

Yeast is added at the rate of about $1.0 \times 10^7$ to $1.5 \times 10^7$ cells per milliliter and fermentation of the wort, whose depth is 5.0 to 5.5 feet, is conducted in pyrex cylinders, 0.5 × 6.0 feet. Duration of fermentation is 2 to 8 days.

The beer is stored under 5 to 7 pounds carbon dioxide pressure at −1.0° to 0° C. from 2 to 10 days and then given a primary filtration through diatomaceous earth. Commercial chillproofing may be added at this time, if desired.

After storage under the described conditions, the beer is carbonated to 2.6–2.8 volumes of carbon dioxide per volume beer, calculated to standard temperatures and pressure. The beer can then be pasteurized and placed in bottles or kegs.

Starch derived from various sources such as corn, rice, milo, rye and the like can be used for fermentation in accordance with this invention. The fermentation can be conducted with good results at temperatures as high as 28° C. Although higher fermentation temperatures tend to promote production of undesirable constituents such as esters, higher alcohols, etc. in conventional worts, this is not the case with the present invention. Generally, fermentation of the starch supplemented with protein (nitrogen) is accomplished with good results within a temperature range of about 12°–28° C. using about 1.0 to $1.5 \times 10^7$ brewer's yeast cells per milliliter. The concentration of yeast inoculum is not critical but it is preferred for economy to use the minimum required for good fermentation — normally about 1.0 to $1.5 \times 10^7$ cells/milliliter. Higher or lower yeast concentrations can be used, but very little is gained by use of higher concentrations while lower levels result in slower fermentations. The converted starch solids can be fermented at levels up to at least 23–25 percent dissolved solids. Theoretically, dissolved solids levels as high as 35 percent could be fermented considering about a 68 percent RDA and the alcohol tolerance of yeast.

Nitrogen in conventional brewers' wort is usually reported as grams per 100 milliliters. It may also be noted as grams protein (N × 6.25). I have found that a combination of protein hydrolyzate and a source of ammonium ion is more effective as fermentation enhancer than either source alone, based on soluble nitrogen content. The range of starch wort nitrogen from the combined sources of protein hydrolyzate plus the source of ammonium ion has been found to be adequate within a range of about 0.023 to 0.200 grams per 100 milliliters. Naturally, the addition of nitrogen may be regulated according to wort carbohydrate solids and also to fermentation temperature.

In the preparation of low and high gravity worts, about 10 to 13 percent and about 18 to 24 percent starch is used, respectively, based on water used. In both cases the protein hydrolyzate level can range from about 0.10 to 0.50 milligram soluble nitrogen per milliliter, preferably about 0.2 to 0.4 mg/ml. The ammonium nitrogen can range from about 0.10 to 0.50 mg,N/ml, preferably about 0.2 to 0.4 mg/ml. The total nitrogen should be about 0.2 to 0.7 mg/ml. The potassium may range from 200 to 600 parts per million and the phosphorus from 100 to 400 parts per million. The potassium and phosphorus levels as well as those for calcium, magnesium and chloride are standard levels found in normal malt beers.

The presence in the fermenting medium of a source of ammonium ions together with a protein hydrolyzate results in an unexpected acceleration of fermentation rate and an increase in the actual amount of carbohydrate fermented. This is believed to be the result of a unique combination of nutrient sources rather than the total quantity of protein or nitrogen. Also, it has been unexpectedly found that when a source of ammonium ions is used together with a protein hydrolyzate, the yeast flocculation problems are not encountered. Various sources of ammonium ions, such as ammonium salts of organic or inorganic acids, can be used provided ammonia is supplied to maintain the pH in the optimum range (pH 5.2–5.8) initially, which may drop to about 3.8–4.3 as the ammonium ion is used. Typical pH curves for a conventional wort and the wort of the present invention are shown in FIG. I. Similarly, urea is a convenient source of ammonium ions and, of course, either gaseous or aqueous ammonia may be used.

Both animal and vegetable protein sources can be hydrolyzed to furnish the protein hydrolyzate employed according to this invention. The protein source should contain at least about 30% protein. Examples of suitable protein sources for the hydrolyzate are cottonseeds, soybeans, linseeds, feathers and the like.

The hydrolysis of the protein source materials can be conducted as is known in the art using various enzymes to solubilize the protein. Suitable enzymes for the hydrolysis include microbial, such as bacterial and fungal; vegetable, such as papain, bromelin and ficin; and animal, such as trypsin and pepsin. The use of enzymes for hydrolysis is preferred over acid hydrolysis since off-flavors are sometimes developed by acid hydrolysis and desirable flavors contributable to the proteases and peptones produced by enzymatic hydrolysis may be lacking. The hydrolysis of the protein is carried out to give a protein hydrolyzate containing up to about 50% water soluble protein with up to about 25% of the water soluble nitrogen as free alpha-amino nitrogen.

FIG. IV of the drawings shows the benefit of hydrolyzed protein compared to unhydrolyzed protein.

The following example describes the preparation of the protein hydrolyzate: Three hundred grams crude protein material are suspended in 700 grams water at 50°–52° C. and at the unadjusted pH of about 5.5. One-tenth percent proteolytic enzyme, based on crude protein weight (i.e., 0.3 gram) is added and hydrolysis conducted, with agitation, for at least 10 hours. Protease P-54, a fungal protease available from Rohm and Haas, is used for the hydrolysis. The protease P-54 contains 30,000 casein solubilization units/gram. One thousand casein solubilization units/gram solubilize 9 grams of casein in 1 hour at 40° C. and pH about 8.0. The following data are typical hydrolysis results with cottonseed flour.

| Time | Soluble Protein/N × 6.25 % as is (based on crude material) | Free alpha-amino Nitrogen/ Soluble N, % |
|---|---|---|
| 0 hours | 10.2 (blank) | 3.8 |
| 1 hour | 18.5 | — |
| 2 hours | 21.2 | — |
| 3 hours | 25.8 | 7.1 |
| 4 hours | 29.8 | — |
| 5 hours | 32.5 | 13.0 |
| 7 hours | 34.0 | 18.3 |
| 10 hours | 45.0 | 23.5 |
| 20 hours | 47.0 | 24.8 |

The effect of employing urea with a protein hydrolyzate on the alcoholic fermentation of converted corn starch is shown in Table 1.

Table 1

| Protein Hydrolyzate Source | Urea Residue in Beer | | | Hrs. −20° C. | Resting Fermentation | | | |
|---|---|---|---|---|---|---|---|---|
| | Flour N | Urea N | Total N | Residual Urea N in Beer | 48 | 72 | 96 | 120 |
| Cotton Seed Flour | mg/ml | mg/ml | mg/ml | mg/ml | RDA* % | RDA % | RDA % | RDA % |
| I | 0.54 | 0.00 | 0.54 | 0.006 | 37.6 | 51.1 | 54.7 | 62.9 |
| II | 0.27 | 0.24 | 0.51 | 0.006 | 37.5 | 57.2 | 65.7 | 68.3 |
| III | 0.14 | 0.36 | 0.50 | 0.052 | 28.8 | 47.8 | 62.2 | 68.3 |
| IV | 0.54 | 0.24 | 0.78 | 0.005 | 37.6 | 49.0 | 55.6 | 62.9 |
| Soy Flour | | | | | | | | |
| I | 0.43 | 0.00 | 0.43 | — | 30.8 | 41.1 | 49.8 | 60.0 |
| II | 0.22 | 0.24 | 0.46 | 0.000 | 21.2 | 38.0 | 49.8 | 64.2 |
| III | 0.43 | 0.48 | 0.91 | — | 31.1 | 41.7 | 49.9 | 60.2 |

*Real Degree of Attenuation

The data show that with 0.24 milligram urea nitrogen per milliliter the residual urea nitrogen in the beer was comparable to that in the urea-free beer, whether cottonseed flour or soy flour hydrolyzate was used. They also show that when the nitrogen supply is 50 percent each from cottonseed flour hydrolyzate and urea, the fermentation rate is faster than when it is only from cottonseed hydrolyzate. Increasing the ratio of urea to cottonseed flour hydrolyzate slowed the fermentation rate but the final RDA was equal to that with the 50:50 ratio.

The results in the following Table 2 show that the fermentation may be conducted at temperatures as high as 28° C. with good results. It is also seen that proteinaceous materials of both plant and animal origin can be used to supply the protein hydrolyzate. The hydrolyzates of various protein sources were prepared as previously described and 25 grams of the boiled 30 percent solids hydrolyzate were added to the starch hydrolyzate to give 2000 milliliters total volume. The low (11.5 percent dissolved solids) and high (23 percent dissolved solids) gravity worts were inoculated with $1.0 \times 10^7$ and $1.4 \times 10^7$ yeast cells/milliliter, respectively.

In addition to the protein sources shown here, it is known that yeast may be subjected to autolysis and used as the source of protein hydrolyzate. Autolysis is accomplished by holding an aqueous suspension of yeast at 40° to 45° C. for 5 hours or more. By this procedure, 46 to 47 percent of the yeast protein has been found to be solubilized. Although products of yeast autolysis in the final beer cause undesirable flavors, apparently those products from an autolysate are consumed by the yeast during growth and fermentation so that they do not contribute to off-flavors.

TABLE 2

| 28° C. FERMENTATIONS | |
|---|---|
| | % Real Degree of Attenuation 40 Hours |
| Urea | |
| Low* | 46.8 |
| High - Rest | 46.8 |
| High - Stir | 51.8 |
| Cottonseed & Urea | |
| Low | 66.1 |
| High - Rest | 60.9 |
| High - Stir | 66.4 |
| Feather & Urea | |
| Low | 64.3 |
| High - Rest | 60.6 |
| High - Stir | 66.0 |
| Linseed & Urea | |
| Low | 65.8 |
| High - Rest | 62.3 |
| High - Stir | 66.5 |
| Soy & Urea | |
| Low | 65.9 |
| High - Rest | 60.1 |
| High - Stir | 63.5 |
| Blood & Urea | |
| Low | 65.8 |

*All low gravity fermentations are "resting"

It is apparent from the above data that with stirring, the high gravity worts attained approximately the same level of real degree of attenuation (RDA) as the low gravity worts. Also, it is apparent that urea alone did not afford the results achieved when used with a protein hydrolyzate.

According to one embodiment of the invention, glucoamylase is incorporated in the wort before or at the time of yeast inoculation to increase markedly the completeness of the fermentation or the attainment of a higher real degree of attenuation (RDA) than is normally achieved in conventional brewing processes. The glucoamylase is added in amounts of from about 0.01 to more than 0.1 percent in accordance with this embodiment. FIGS. II and III illustrate the effect of incorporating glucoamylase in the wort on rate and degree of fermentation at 12° α 13° C. and at 22°–24° C., respectively.

The beer produced in accordance with this invention is a light, good tasting beer containing a relatively low level of undesirable esters and higher alcohols. If desired, it can be blended with relatively small amounts, say 10–15 percent, of conventional barley malt beers with which it is compatible.

The advantages accruing from the present invention are numerous. For example, beers of excellent quality can be produced with great economy with respect to time, e.g., beer can be produced in 5 or 6 days compared to the usual 20 to 45 days. By practice of the invention, a brewer can ferment at high gravity levels and with shorter fermentation times, thereby increasing substantially the production capacity of the brewery. Also, by practice of this invention rapid flocculation of yeast is achieved at the desired degree of attenuation or fermentation. As is known, flocculence or settling out of the yeast is required so that the been can be easily and quickly filtered to remove the yeast and prevent autolysis which may contribute to undesirable flavors in the beer.

By practice of the present process there can be produced beer containing about 7.5–7.6 percent alcohol by weight, which is considerably higher than conventional commercial beers. The new beer has good foam characteristics and develops less than 10 parts per million ethyl acetate, while North American lager beers, fermented under colder conditions, are reported to contain 15–25 parts per million. Also, higher alcohols are significantly reduced and isoamyl acetate is negligible.

Similarly, diacetyl, characterized by a rancid butter odor/flavor, is present at 0.1–0.3 part per million in commercial beer, while the beer produced in accordance with this invention develops only 0.02–0.04 part per million.

The chill haze stability of beer produced in accordance with the invention is generally superior to conventional beer. Quite significantly, the desired chill stability (clarity) of the new beer of this invention can be achieved by drastically reducing or completely eliminating conventional chillproofing. A comparison of the clarity stability of the beer of the invention with a widely distributed commercial beer is shown in Table 3.

TABLE 3

| | FTU* at 0° C. | |
|---|---|---|
| | Beer of Invention | Commercial |
| Fresh | 30 | 42 |
| 1 Week 43° C.** | 32 | 66 |
| 2 Weeks 43° C.** | 34 | 80 |

*Formazin Turbidity Unit which is the standard of haze index of the American Society of Brewing Chemists and varies directly with the degree of beer haze.
**One and two week incubation at 43° C. (110° F.) is considered equivalent to 90 and 120 days "in the trade".

Those modifications and equivalents which fall within the spirit of the invention are to be considered a part thereof.

What is claimed is:

1. A process for producing a non-distilled starch-based beer-type alcoholic beverage which comprises:
   (a) subjecting liquefied starch derived from a source other than malt to hydrolysis with beta-amylase to produce a starch hydrolyzate containing fermentable carbohydrates and to produce a starch hydrolyzate having a dextrose equivalent value of from about 35 to 65 and a monosaccharide content of not more than about 10% by weight of carbohydrate content:
   (b) preparing an aqueous liquid wort containing the said starch hydrolyzate in an amount from about 10 to 24% based on water content, a microbial, vegetable or animal protein hydrolyzate in an amount to provide about 0.10 to 0.50 milligram soluble nitrogen per milliliter having up to about 50% of the total as water soluble protein and up to 25% of the water soluble nitrogen as free alpha-amino nitrogen, a source of ammonium ions in an amount to provide about 0.10 to 0.50 milligram of nitrogen per milliliter, and a potassium phosphate salt in an amount to provide about 200 to 600 parts potassium per million and about 100 to 400 parts phosphorus per million, the maximum amount of malt in said liquid wort not exceeding about 2.5% by weight of starch;

(c) inoculating the liquid wort of step (b) with yeast; and (d) fermenting for a period of not more than 8 days at a temperature of from about 12 to 40° C. the liquid mass resulting from step (c) to produce a non-distilled starch-based beer-type alcoholic beverage.

2. The process of claim 1, wherein the source of ammonium ions is urea.

3. The process of claim 1, wherein the fermenting step is carried out at a temperature of 22°-28° C.

4. The process of claim 1, wherein the mass undergoing fermentation contains a dissolved solids level up to about 25 percent.

5. The process of claim 1, wherein the mass undergoing fermentation contains glucoamylase.

6. The process of claim 1 wherein the starch hydrolyzate employed has a dextrose equivalent value of from about 40 to 55.

* * * * *

UNITED STATES PATENT AND TRADEMARK OFFICE
CERTIFICATE OF CORRECTION

PATENT NO. : 4,073,947
DATED : February 14, 1978
INVENTOR(S) : Paul R. Witt, Jr.

It is certified that error appears in the above-identified patent and that said Letters Patent are hereby corrected as shown below:

Column 6, line 38, in the column headings in Table 1, "Hrs. -20° C." should be under "Resting Fermentation"

Column 7, line 23, after "High - Rest", "46.8" should be -- 44.0 --

Signed and Sealed this

Sixteenth Day of May 1978

[SEAL]

Attest:

RUTH C. MASON
Attesting Officer

LUTRELLE F. PARKER
Acting Commissioner of Patents and Trademarks